United States Patent [19]
Koch et al.

[11] Patent Number: 5,415,224
[45] Date of Patent: May 16, 1995

[54] APPARATUS FOR COLD DRYING OF GAS

[76] Inventors: Berthold Koch, Pützstrasse 4; Wolfram Seiler, Dürerstrasse 17, both of D-4040 Neuss 1, Germany

[21] Appl. No.: 195,573

[22] Filed: Feb. 14, 1994

Related U.S. Application Data

[63] Continuation of Ser. No. 11,430, Jan. 29, 1993, abandoned.

[30] Foreign Application Priority Data

Jan. 31, 1992 [DE] Germany .......... 42 02 802.7

[51] Int. Cl.⁶ .................................................. F25B 9/10
[52] U.S. Cl. ..................................... 165/111; 62/401
[58] Field of Search ................ 165/111; 62/401, 86

[56] References Cited

U.S. PATENT DOCUMENTS

| | | | |
|---|---|---|---|
| 2,011,100 | 8/1935 | Woods | 62/86 |
| 3,049,891 | 8/1962 | Barkelew | 62/401 |
| 3,200,607 | 8/1965 | Williams | 62/401 |
| 4,665,714 | 5/1987 | Keller | 62/401 |
| 4,991,408 | 2/1991 | Liszka | 62/401 |

FOREIGN PATENT DOCUMENTS 428058  4/1935  United Kingdom .......... 62/401

Primary Examiner—John Rivell
Assistant Examiner—L. R. Leo
Attorney, Agent, or Firm—Schweitzer Cornman & Gross

[57] ABSTRACT

Apparatus for cold drying or cold-condensing of gas comprises a heat exchange device and drying device through which a cold-carrying medium flows and which is cooled to such an extent that moisture contained in the gas under treatment is condensed out, frosted out, frozen out and/or liquefied. The heat exchange device and the drying device comprise an integral unit. At least one discharge pipe drains away the liquid condensate, the frost or ice and/or the liquid which are separated from the gas flow.

7 Claims, 4 Drawing Sheets

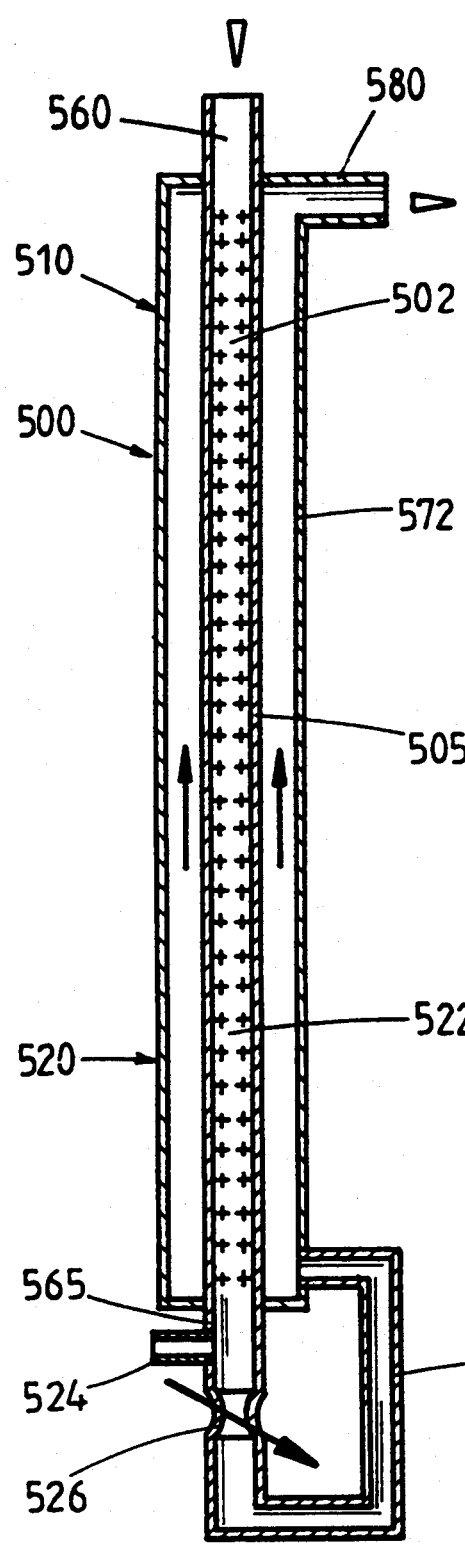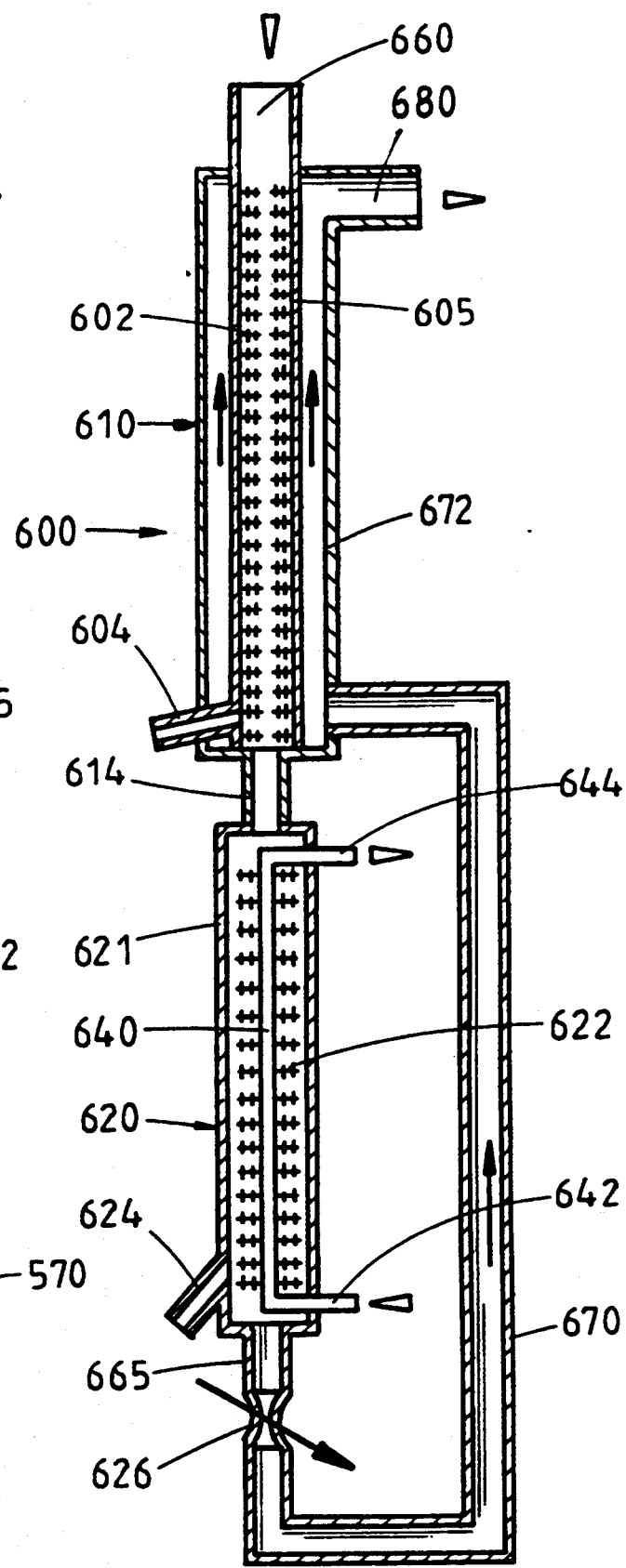

APPARATUS FOR COLD DRYING OF GAS

This is a continuing application of U.S. Ser. No. 08/011,430, filed on Jan. 29, 1993, now abandoned.

BACKGROUND OF THE INVENTION

The invention relates to apparatus for the cold drying of gas, in particular of compressed air, including a heat exchange means and a drying means in an integral unit, through which a cold-carrying medium flows to cool the gas to such a temperature that the moisture present in the gas is precipitated as a condensate.

Generally speaking moisture, as a rule water vapour, is contained in gases under atmospheric conditions, but there may also be quantities of other substances which are volatile at elevated temperatures. This applies in particular to gases which are under pressure.

For drying gases, in particular compressed air, above 0° C. cold dryers are employed and below a temperature of 0° C. and below the pressure dew point adsorption or absorption dryers are employed.

In the cooling or cold condensing of gases such as air this takes place—in so far as drying is necessary—in a separate step, after which it is then cooled down to the desired value. Accordingly two independent and separate units are required.

Accordingly, the cold drying of gases results in problems both from the energy point of view as well as from the structural aspect.

Apparatus having favourable energy consumption for the cold drying of gases is known from DE-A-39 41 713. This employs two heat exchangers, the main heat exchanger employed for the cooling having a pre-heat exchanger connected ahead of it, in which the incoming gas is cooled by the already dried emerging gas. In order to prevent icing-up, which can lead to failure of the equipment, heat transfer is restricted so that undisturbed operation is achieved. This requires special measures to be taken in construction, and a substantial outlay in control equipment.

It is the aim of the invention to provide apparatus of simple construction and effective operation for the cold drying of gases, in which the danger of icing-up is eliminated.

SUMMARY OF THE PRESENT INVENTION

According to the invention, apparatus for the cold drying or cold condensing of gas comprises an integral heat exchange means and drying means, said heat exchange means and drying means having an inlet for said gas, said inlet leading to first passage means through which said gas flows to be cooled and dried and an outlet for said cooled and dried gas, and second passage means for flow of a cold-carrying medium from a supply to cool and dry said gas, such that moisture contained in said gas condenses out, forms frost, freezes out and/or liquefies, said apparatus incorporating at least one discharge pipe for draining said liquid condensate, said frosted condensate, said frozen condensate and/or said liquid separately from said gas outlet.

In the invention cooling and drying are now combined, even in the case of cooling below 0° C. The liquid condensate is removed as it occurs, through a discharge pipe mounted at a suitable point, thus avoiding an excess of moisture which could lead to the apparatus icing up in the case of cooling to low temperatures.

Preferably, the apparatus has at least two heat exchange zones, of which at least one can be cooled to a temperature greater than 0° C. A discharge pipe for condensate can then be provided at least at the end of this cooling zone, and also in its initial section where experience has shown that a large part of the liquid condensate occurs.

Alternatively, the apparatus may have at least two heat exchange zones, of which at least one can be cooled to a temperature below 0° C. Here the freezing out takes place in the form of coarse deposits of frost on specially shaped surfaces of cooling surfaces. Also there can be provided in this zone a discharge pipe for condensate in order to separate out liquid components.

An apparatus for cooling in stages can be constructed, in which each of the heat exchange zones is provided with a separate supply of cold-carrying medium. In this way the individual heat exchange zones can be brought to different temperatures independently of one another.

The cold-carrying medium can be in the form of a cold medium coming from refrigerating equipment, to effect a regulation of the temperature, in particular above the pressure of the cold medium. Externally regulated cold-carrying media such as brine or deep-cooled liquids may also be used. In any case one can operate with several different temperature levels, which is particularly important when there is also pre-cooling above 0° C. In this case it is not necessary for there to be interchange between liquid and solid phases in the condition of the condensate.

In a further embodiment, the second passage means is provided around the first passage means, the gas emerging from the first passage means being fed back into the second passage means, the heat exchange zones being followed by a device for relieving the pressure of the gas.

The invention will be further explained by way of example in conjunction with the accompanying drawings, in which:

DESCRIPTION OF THE DRAWINGS

FIG. 5 shows a fifth embodiment of apparatus according to the present invention which is of similar construction to the apparatus of FIG. 4 but in which the gas flow is de-pressurised under control to regulate the fall in gas temperature.

FIG. 6 shows a sixth embodiment of apparatus according to the present invention, in which two separate heat exchange zones of the kind shown in FIGS. 4 and 5 and FIGS. 2 and 3 are connected together.

DETAILED DESCRIPTION OF THE INVENTION

Figure 1:
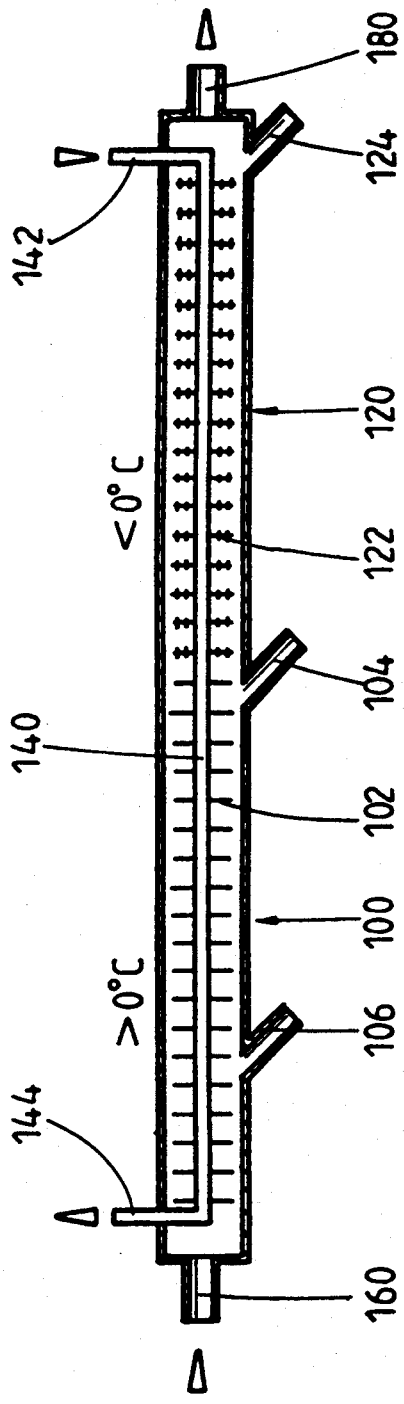
FIG. 1 shows a first embodiment by way of example of apparatus according to the present invention in which a continuous heat exchanger is provided with a drying function for temperatures both higher and also lower than 0° C.

FIG. 1 shows a first embodiment by way of example according to which a continuous heat exchanger 100, 120 is provided in the form of a longitudinally extending cylindrical tube which has a pipe 140 arranged centrally within it and extending over substantially its entire length, a cold-carrying medium being conducted through the pipe. At one end of the heat, exchanger 100, 120 there is a gas inlet 160 through which the gas to be dried is introduced into the heat exchanger 100, 120 and the gas outlet 180 for the dried gas is provided at the other end.

The heat exchanger is divided into two adjacent zones, and in the heat exchange zone 100 adjacent to the gas inlet 160 a temperature higher than 0° C. prevails, whereas in the zone nearer the gas outlet 180 the temperature is less than 0° C., the temperatures being reduced respectively by the continuous cold-carrying medium flowing through the pipe 140. In this arrangement an inlet 142 for the cold-carrying medium is led through the wall of the heat exchanger in the neighbourhood of the gas outlet 180 and an outlet 144 for the cold-carrying medium is in the neighbourhood of the gas inlet 160, the medium being progressively warmed up on its path through the pipe 140 and through the heat exchange zones 100, 120.

In this arrangement the degree of heating can be controlled for example by its velocity of flow or by its pressure and/or the quantity flowing through.

Cooling surfaces 102, 122 are arranged on the outside of the pipe 140, shaped specially for each heat exchange zone 100, 120 so that they can fulfil their cooling and drying function in an optimum manner. Thus, the cooling surfaces 122 in the heat exchange zone 120 which is operated at temperatures below 0° C. are arranged so that they favour the deposition of frost or ice. On the underside of the heat exchanger discharge pipes 104, 106, 124 are led out and in fact in the heat exchange region 100 there is respectively a discharge pipe 104 for liquid condensate in the neighbourhood of the transition point to the heat exchange zone 120 and a discharge pipe 106 for liquid condensate about one third of the way along the cooling stretch, that is to say, lying nearer the gas inlet 160, and in the heat exchange zone 120 at the end of the cooling stretch, that is to say about in the region of the inlet 142 for the cold-carrying medium, there is a discharge pipe 124 for so-called ice-condensate or liquefied gas.

Gas introduced into the apparatus through the gas inlet 160 is cooled by the action of the cold-carrying medium, and at first a temperature greater than 0° C. is maintained so that condensate precipitates out in the liquid phase and is conducted away through the discharge pipe 106 and also the discharge pipe 104. Using this arrangement for discharging liquid condensate the formation of massive ice deposits in the heat exchange zone 120 is obviated.

The cooled and partially dried gas then passes into the heat exchange zone 120, of which the cooling surfaces 122 have an increased surface area compared to those in the heat exchange zone 100 and favour the precipitation of the condensate as fine ice which adheres to the cooling surfaces 122.

To free the deposits of frost or fine ice the gas flow is advantageously interrupted and the deposit is removed by impact or by thawing. In cases where the gas flow is not to be interrupted, one can switch over to another heat exchanger or another apparatus of the same construction so that alternate operation can be undertaken.

Figure 2:
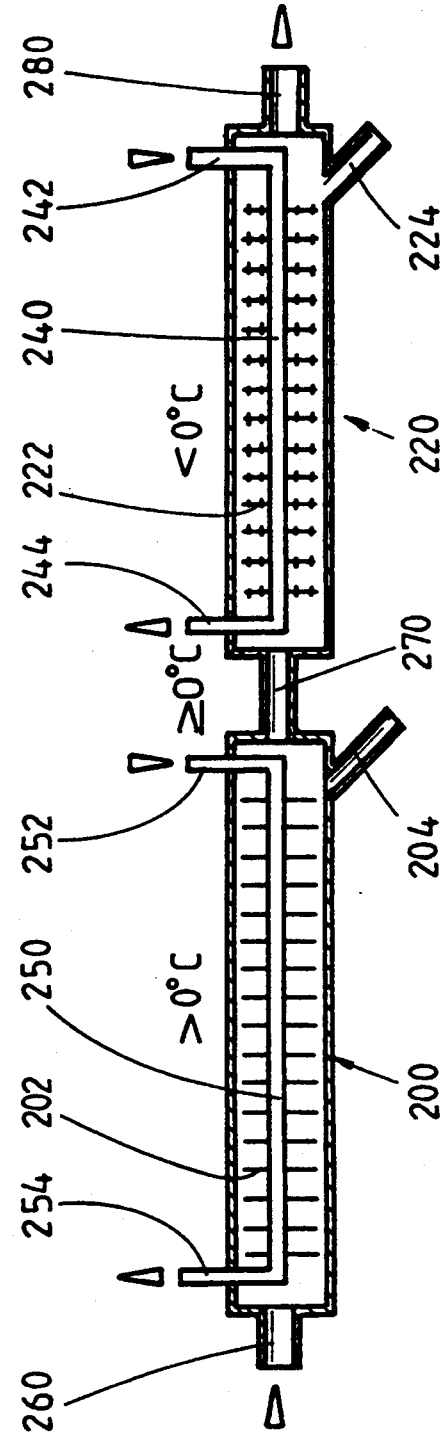
FIG. 2 shows a second embodiment of apparatus according to the present invention in which a first heat exchange zone is provided with a drying function for temperatures greater than 0° C. and a second heat exchange zone, separate from the first, is provided with a drying function for temperatures lower than 0° C.

In FIG. 2 is illustrated a second embodiment by way example, in which a first heat exchange zone 200 with a drying function is provided for temperatures greater than 0° C. and a separate second heat exchange zone 220 with a drying function is provided for temperatures below 0° C. The two heat exchange zones 200, 220, which form a longitudinally extending unit, communicate through a connecting pipe 270 which is connected to two adjacent opposing faces of the heat exchange zones 200, 220, which are formed as substantially closed tubes, and in which prevails a temperature of about 0° C. or slightly above. At the other end face of the heat exchange zone 200 there is an inlet 260 through which the gas to be dried is introduced into the heat exchange zone 200. At the other end face of the heat exchange zone 220 there is the gas outlet 280 for the dried and cooled gas.

For each heat exchange zone 200, 220 there is a separate pipe 240, 250 for cold-carrying medium, arranged substantially centrally over the entire length of the respective heat exchange zone 200, 220, the pipe 240, 250 being supplied with a cold-carrying medium in such a way that the temperature profile described above is maintained. Again each pipe carries cooling surfaces 202, 222 which are shaped according to the specific cooling requirement. Inlet 252, 242, and outlet 254, 244 are arranged as in the embodiment described in FIG. 1, but now in each of the heat exchange zones 200, 220.

Furthermore in each of the heat exchange zones 200, 220 there is provided on the underside a discharge pipe 204, 224 for condensate, each at the end of the cooling stretch of the corresponding zone. In this arrangement the discharge pipe 204 serves for discharging liquid condensate precipitated in the heat exchange zone 200 before the gas enters the connecting pipe 270, which is narrower than the heat exchange zones 200, 220. The deposition in the form of ice condensate or liquified gas again takes place in the lower temperature heat exchange zone 220.

Figure 3:
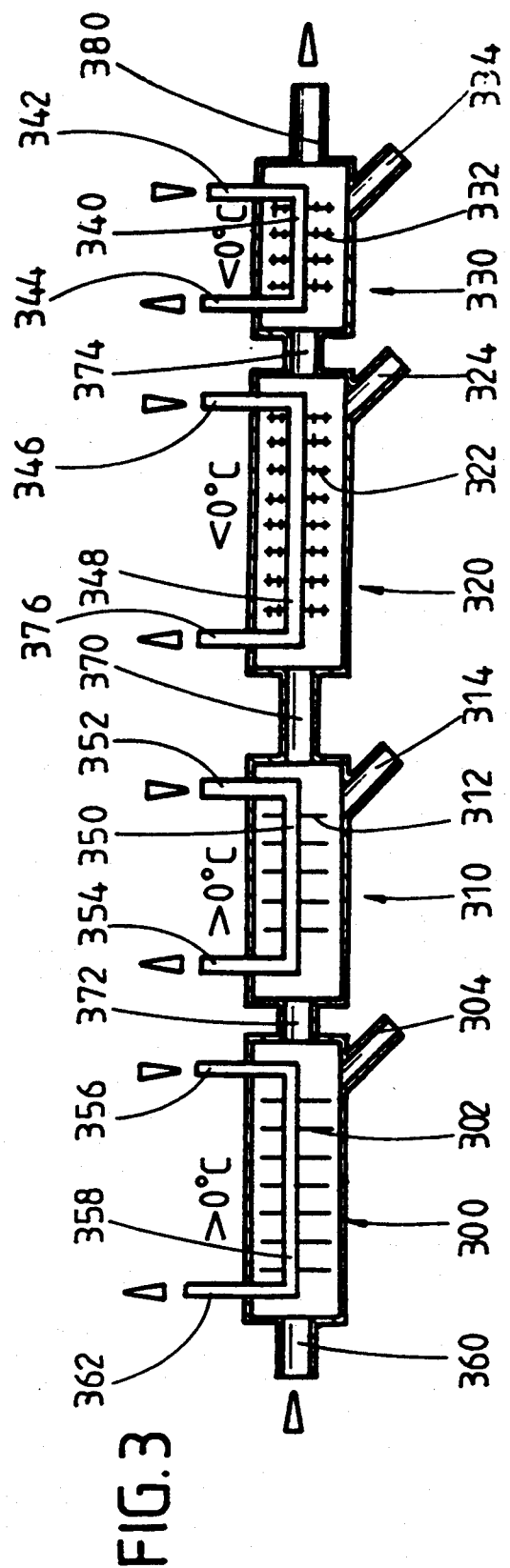
FIG. 3 shows a third embodiment of apparatus according to the present invention in which a first and a second heat exchange zone is provided with a drying function for temperatures greater than 0° C. and a third and a fourth heat exchange zone with a drying function for temperatures below 0° C., the zones each being separate.

The cooling and drying can also take place in several temperature stages. Thus, FIG. 3 shows a third embodiment in which a first and a second heat exchange zone 300, 310 are provided for the drying function for temperatures greater than 0° C. and a third and a fourth heat exchange zone 320, 330 with a drying function for temperatures below 0° C., the zones each being separate so that a different temperature can be set in each of them.

The gas which is to be dried and cooled is introduced through a gas inlet 360 at the end face of the first heat exchange zone 300, and there it is cooled in a first stage, the condensate which is precipitated in liquid form being conducted away through the discharge pipe 304; it then passes through a connecting pipe 372 of reduced cross-section into the second heat exchange zone 310 where a lower temperature prevails than in the first zone, but the temperature still lies above 0° C. Again condensate can be removed from the heat exchange zone through a discharge pipe 314. The gas then passes through a connecting pipe 370 corresponding to the connecting pipe 270 of FIG. 2 into the third heat exchange zone 320 in which the temperature is now set lower than 0° C., and from there through a connecting pipe 374 into the fourth heat exchange zone 330 where the lowest temperature in the entire apparatus prevails, until finally it is removed through the gas outlet 380. The heat exchange zones 320 and 330 are each likewise also provided with a discharge pipe 324 and 334 respectively at the end of the cooling stretch in order to allow the precipitated condensate to escape.

Each heat exchange zone 300, 310, 320, 330 has a pipe 358, 350, 348, 340 passing through it, with an inlet 356, 352, 346, 342 for the cold-carrying medium at the low-temperature end of the respective heat exchange zone and an outlet 362, 354, 376, 344 leading out at the high-temperature end, and fed in a manner known in itself from a refrigerating apparatus. Again cooling surfaces 302, 312, 322, 332 of an appropriate form are arranged on the pipes 358, 350, 348, 340. In this arrangement they are arranged at a closer mutual spacing in the first heat exchange zone 300 than in the second.

The heat exchange zones can have different lengths where this appears to be necessary for an optimum cooling function. For example the fourth heat exchange zone 330 is made substantially shorter than the remainder.

In the embodiments described so far the cooling takes place through a cold-carrying medium such as a cooling medium from one or more refrigerating equipments. However, it is also possible to make use of a counter-current cooling layout using the cooled gas, as will now be described in conjunction with FIG. 4.

Figure 4:
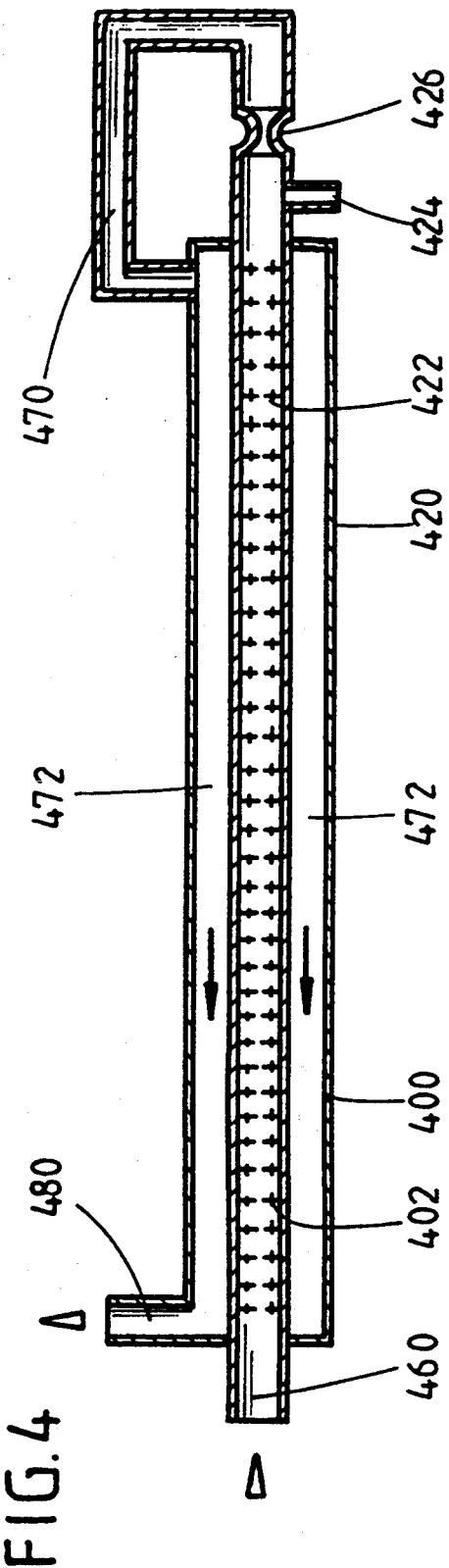
FIG. 4 shows a fourth embodiment of apparatus according to the present invention, in which a continuous heat exchanger is provided with a drying function as well as with a cooling counter-current flow produced by a reduction in pressure.

According to FIG. 4, cooling surfaces 402, 422, of the desired form are arranged on the inner walls in a heat exchanger 400, 420 having two heat exchange zones which are in the form of a cylindrical pipe. In this arrangement the cooling surfaces 402 in the heat exchange zone 400 correspond to those for temperatures above 0° C. and the cooling surfaces 422 in the heat exchange zone 420 those for temperatures below 0° C.

The heat exchanger 400, 420 is surrounded over substantially its entire length by a cooling tube 472 which communicates through a pipe loop 470 with the heat exchanger 400, 420 and it has a gas outlet 480 at its other end. Gas introduced through a gas inlet 460 into the heat exchanger 400, 420 is thus fed back and employed as a cold-carrying medium. The further cooling of the gas necessary for this takes place within the pipe loop 470 in which, downstream of a discharge pipe 424 for condensate, there is provided a restriction 426, for example in the form of a venturi nozzle. The gas expands downstream of the restriction 426 and thereby is cooled.

Using such an arrangement low temperatures can be achieved after a short time, the moisture being condensed out of the gas, treated in this way, to a progressively increasing extent. At the same time using such a self-generating process it is very easy to obtain gas liquefaction at defined pressure/temperature relationships. The liquefied gas can however, like the condensate, be conducted away out of the heat exchanger.

The embodiment according to FIG. 5 is similar to the embodiment of the apparatus described in conjunction with FIG. 4. Again there is a counter-current cooling using the already-cooled gas itself. The heat exchanger 500 in the form of a cylindrical tube has two heat exchange zones 510 and 520, with the flow of gas taking place through an inner tube 505 which is enclosed in an outer tube 572, which can be described as the cold tube. The outer tube 572 extends over the great part of the length of the inner tube 505.

Radially inwardly projecting cooling surfaces 502 and 522, which could also be described as heat exchange surfaces, are arranged inside the inner tube 505. The cooling surfaces 502 provided in the heat exchange zone 510 are provided for temperatures above 0° C. and the cooling surfaces 522 in the heat exchange zone 520 are for temperatures below 0° C. In the drawing these cooling surfaces are diagrammatically illustrated as being the same, but in a practical version of the apparatus they could also be of different form.

The upper end 560 of the inner tube 505 where it projects out of the outer tube 572 serves as the gas inlet, whilst the opposite end 565 is connected through a pipe loop 570 to the lower end of the outer tube 572. Gas introduced into the inner tube 505, and thereby into the heat exchanger 500, through the upper end 560 serving as the gas inlet is therefore fed back from bottom to top from the inner tube and in its reverse flow through the outer tube 572 is employed as the cold-carrying medium. The further cooling of the gas which is necessary for this takes place within the tube loop 570 in which, downstream of a discharge pipe 524 for condensate, there is arranged a throttle 526 which can be a venturi nozzle or also an adjustable throttle.

The gas conducted through the inner tube 505 expands downstream of the throttle 526 and thereby is cooled before it reaches the outer tube 572 and flows through this from bottom to top in the direction of the arrow after which it leaves the heat exchanger 500 through an outlet 580.

Also with such an arrangement low temperatures can be reached after a certain running time, moisture contained in the gas passing through being progressively more condensed out. With defined pressure/temperature relationships and using such a self-generating process, one can very easily achieve liquefaction of the gas.

The heat exchanger 600 illustrated in FIG. 6 combines two heat exchange zones 610 and 620 of the designs shown in FIGS. 4 and 5 and 2 and 3.

The heat exchange zone 610 contains an inner tube 605 in which are arranged approximately radially inwardly projecting cooling surfaces 602 or heat exchange surfaces. This inner tube 605 is enclosed over almost its entire length in an outer tube 672 which can also be described as the cold tube, so that the gas entering through the projecting upper end 660 can flow back from the inner tube 605 from bottom to top in the direction of the arrow to an outlet 680, acting so to speak as a cooling medium, where it leaves the heat exchanger.

Near the lower end of the inner tube 605 there is arranged a stub-shaped discharge pipe 604 through which condensate being precipitated in the inner tube 605 can be conducted out of the heat exchanger in a manner not described further.

The second heat exchange zone 620 is connected through a connecting pipe 614 extending co-axially with respect to the inner tube 605 and has a tubular housing 621, near the lower end of which there is arranged a stub-shaped discharge pipe 624 by which condensate precipitated in the second heat exchange zone 620 can be conducted away in a manner not illustrated further.

A pipe 640 for a cold-carrying medium is arranged co-axially in the tubular housing 621 of the second heat exchange zone 620 and the cooling medium flows in through an inlet 642 present at its lower end, escaping again through an outlet 644 provided at the upper end of the heat exchange zone 620. Radially projecting cooling surfaces 622 or heat exchange surfaces are provided on the pipe 640 within the housing 621.

Connected to the lower end 665 of the housing 621 there is a pipe loop 670 in which is present a throttle 626, for example a venturi nozzle, which may be variable. This pipe loop 670 connects the lower end of the second heat exchange zone 660 to the lower end of the outer tube 672 of the upper heat exchange zone 610, so that the gas flowing through the two heat exchange zones 610 and 620 can be fed back to the first heat exchange zone 610 with inter-cooling taking place in the pipe loop 670 so that there as already described above in a different connection it acts as a cold-carrying or cooling medium.

Thus, the manner of operation of the heat exchanger 600 is similar to that described in conjunction with the previously described embodiments.

Figure 7:
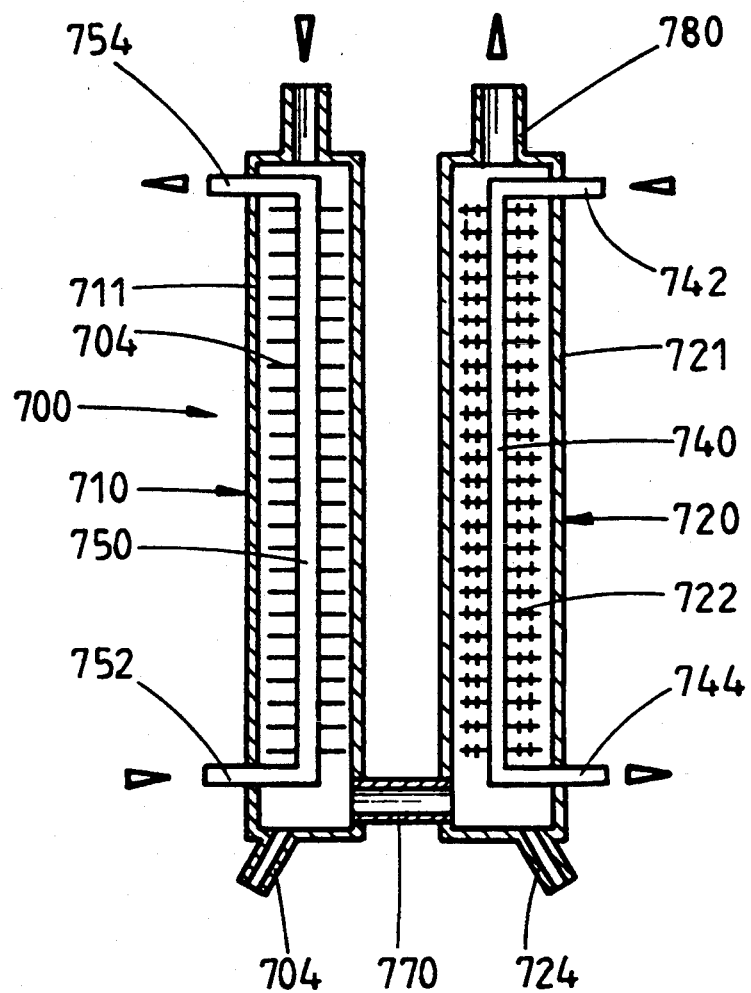
FIG. 7 shows a seventh embodiment of apparatus according to the present invention, in which two mutually separate heat exchange zones of the kind shown in FIG. 2 are provided side by side in an upstanding arrangement.

The heat exchanger 700 illustrated in FIG. 7 has two heat exchange zones 710 and 720 which are constructed in a similar manner to the two heat exchange zones of the embodiment of FIG. 2 and connected in series, but they stand upright side-by-side. The heat exchange zone 710 in this arrangement is for temperatures above 0° C. and the heat exchange zone 720 is designed for temperatures below 0° C. In a pipe 770 which connects the two heat exchange zones 710 and 720 at their lower ends the temperature is about 0° C.

The heat exchange zone 710 has an upstanding tubular housing 711, on the upper end of which is mounted a stub 760 serving as an inlet for the gas to be treated. Within the tubular housing 711 there extends co-axially a tubular pipe 750 for the passage of a cold-carrying medium which enters through an inlet 752 near the lower end of the housing 711 and leaves the heat exchange zone 710 near the upper end of the housing 711 through an outlet 754.

Radially extending cooling surfaces 702 are arranged on the tubular pipe 750 inside the housing 711 and can be described as heat exchange surfaces, serving for improving the heat exchange between the gas flowing from top to bottom and the cold-carrying medium or cooling medium flowing in the opposite direction.

A stub-like discharge pipe 704 for conducting away the condensate precipitated in the housing 711 is provided on the lower end of the housing 711.

The heat exchange zone 720 has an upstanding tubular housing 721, at the lower end of which there is arranged a stub-like discharge 724 for conducting away condensate arising in the housing 721, this condensate generally being precipitated in the form of ice or frost. A stub 780 is present at the upper end of the tubular housing 721 to serve as an outlet for the gas under treatment.

Provided within the housing 721 of the heat exchange zone 720 is a co-axially extending tubular pipe 740 for the passage of a further cold-carrying medium which enters near the upper end of the housing 721 through a stub-like inlet 742 and leaves the heat exchange zone 720 again through a stub-like outlet 744 present near the lower end of the housing 721.

Radially extending cooling surfaces 722 are arranged on the tubular pipe 740 within the housing 721 and serve to improve the heat exchange between the gas under treatment flowing from bottom to top through the housing and the cold-carrying medium flowing through the tubular pipe 740 in the opposite direction.

The heat exchanger 700 illustrated in FIG. 7 operates substantially as described in connection with the previously explained embodiments by way of example.

Generally speaking all the heat exchangers and gas-conducting containers of FIGS. 1 to 6 could be arranged horizontally or vertically. In this connection the arrangement of the discharge connections or condensate pipes would differ in layout.

What we claim is:

1. In an apparatus for cold drying of gas by removing from a gas a vapor having a freezing point by drying and cooling the gas in countercurrent heat exchange with a cooling medium, the apparatus having an inlet for the gas to be cooled and dried, an outlet for the cooled and dried gas, a gas treating pipe for flowing therethrough the gas to be dried and cooled, a coolant medium pipe for flowing the coolant medium therethrough, the gas treating pipe being disposed substantially concentrically with the coolant medium pipe, the improvement which comprises (a) the cold drying apparatus having a first zone for drying and cooling the gas above the freezing point of the vapor, and a second zone for drying and cooling the gas at or below said freezing point, (b) the gas treating pipe passing through said first and said second zones, (c) the inlet being adapted to introduce the gas into said first zone, (d) a plurality of first gas cooling fins within the gas treating pipe in said first zone, (e) said first gas cooling fins having first cooling surfaces for condensing the majority of the vapor contained in the gas flowing therethrough, (f) a drain for removing the condensed vapor from said first zone, and (g) a plurality of second gas cooling fins within the gas treating pipe in said second zone, (h) said second gas cooling fins having second cooling surfaces for condensing the vapor remaining in the gas after leaving said first zone, (i) said second surfaces of each of said second cooling fins being sufficiently large for condensing liquid from the gas in the form of a fine solid condensate that adheres to said second surfaces.

2. The cold drying apparatus of claim 1, wherein (a) the vapor is water, and said fine solid condensate comprises fine ice.

3. The cold drying apparatus of claim 1, wherein (a) each of said second surfaces are larger than each of said first surfaces.

4. The cold drying apparatus of claim 1, further comprising (a) means for further cooling the gas from said outlet, and (b) means for introducing said cooled gas into said coolant medium pipe for use of the further cooled gas as the cooling medium.

5. The cold drying apparatus of claim 4, wherein (a) said means for further cooling the gas comprises means for relieving the pressure of the cooled and dried gas, and (b) the supply of cooling medium to said coolant medium pipe is controlled by the extent of pressure relief of said gas.

6. The cold drying apparatus of claim 1, wherein (a) said first zone and said second zone are physically separated from each other, (b) each of said zones having a coolant inlet and a coolant outlet, and (c) each of said zones are connected to each other by said gas treating pipe.

7. The cold drying apparatus of claim 1, comprising (a) at least one drain in each zone for removing vapor condensed in that zone.

* * * * *